Aug. 7, 1951      W. O. WOODS      2,563,571
VEHICLE ELECTRICAL DISTRIBUTION SYSTEM
Filed March 31, 1950      4 Sheets-Sheet 4
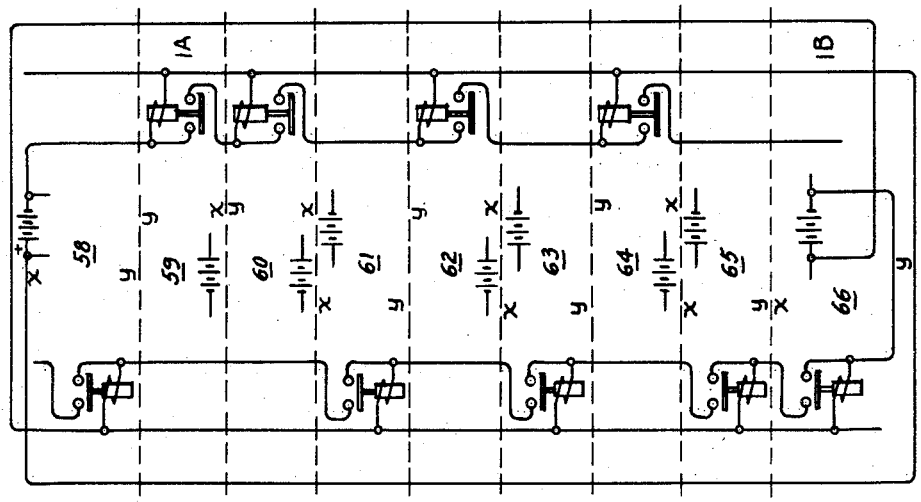
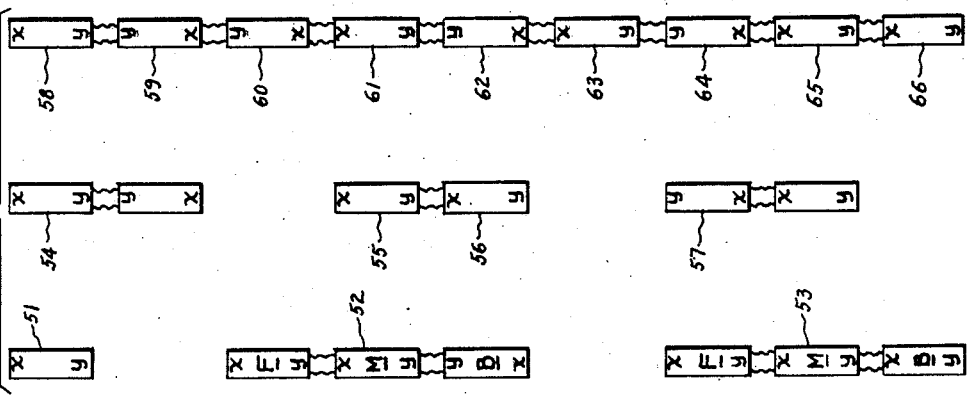
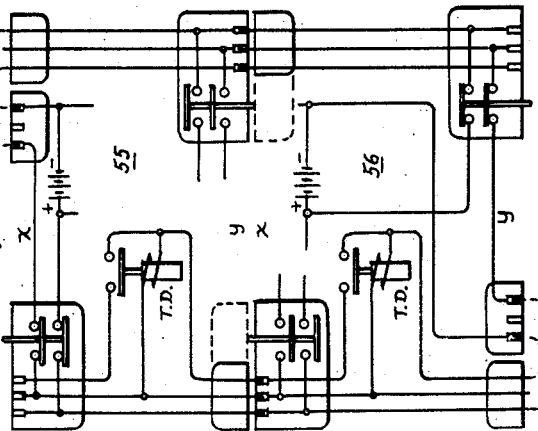
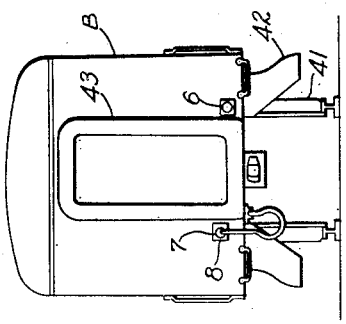
Inventor:
William O. Woods,
by *Ernest H. Britton*
His Attorney.

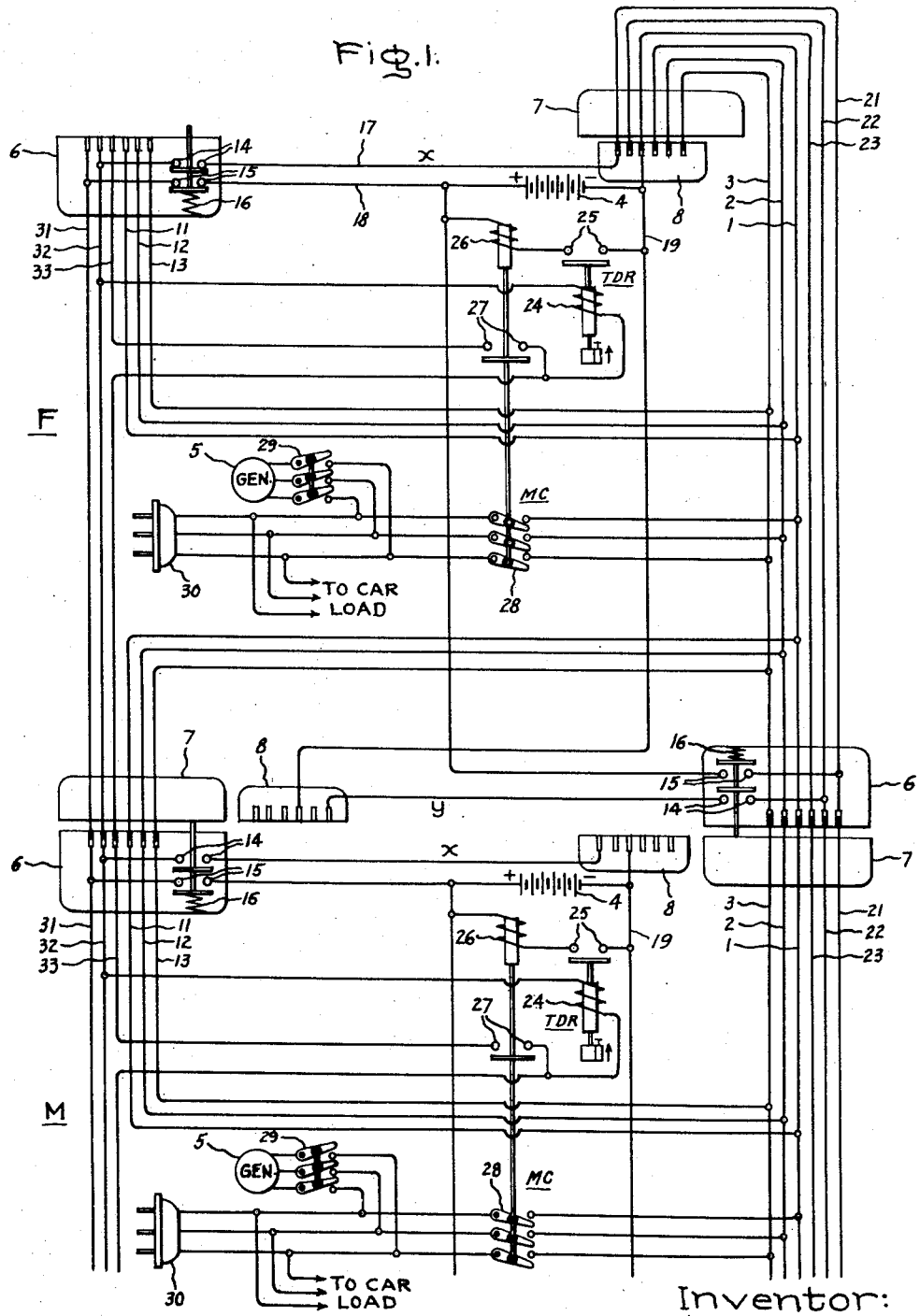

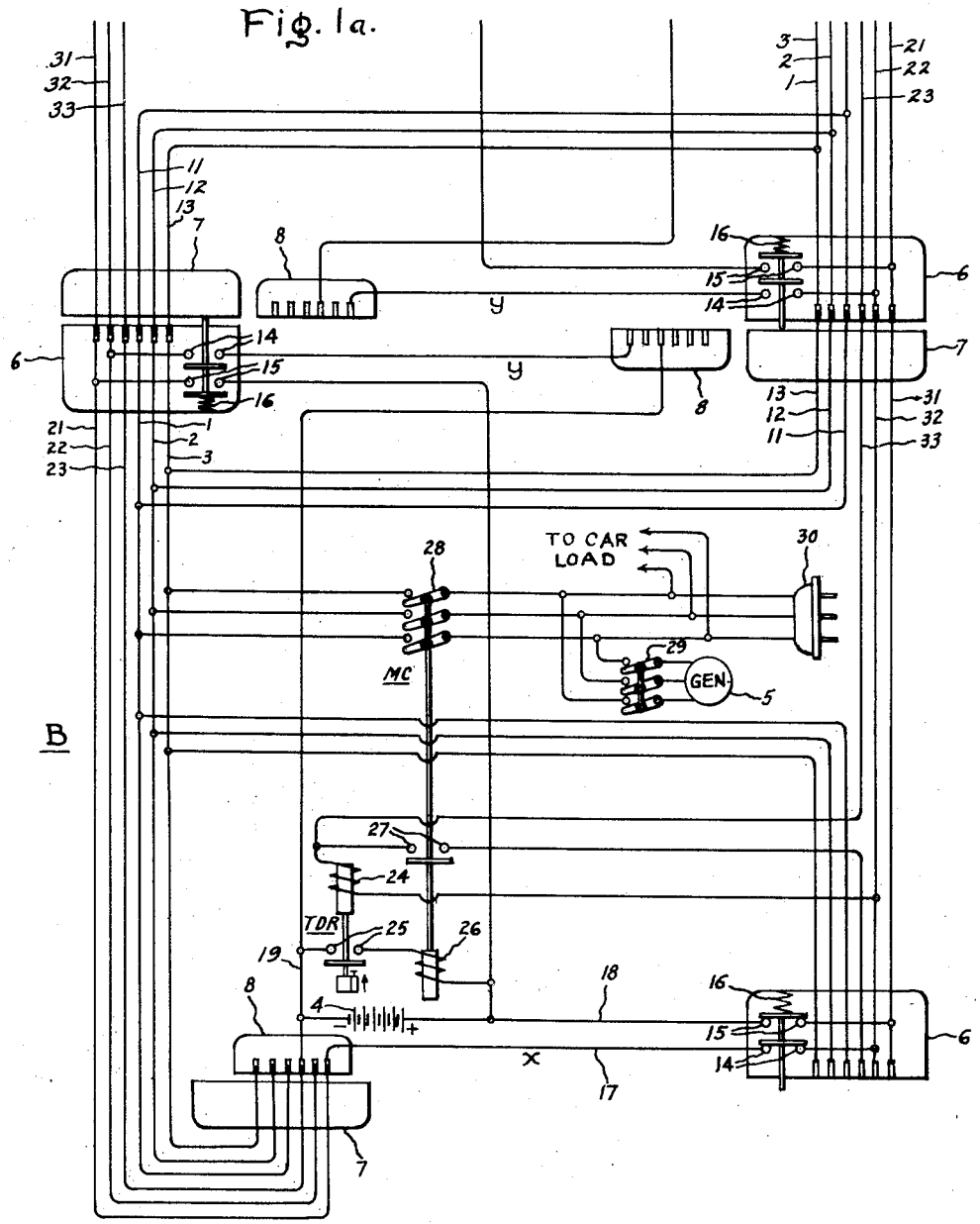

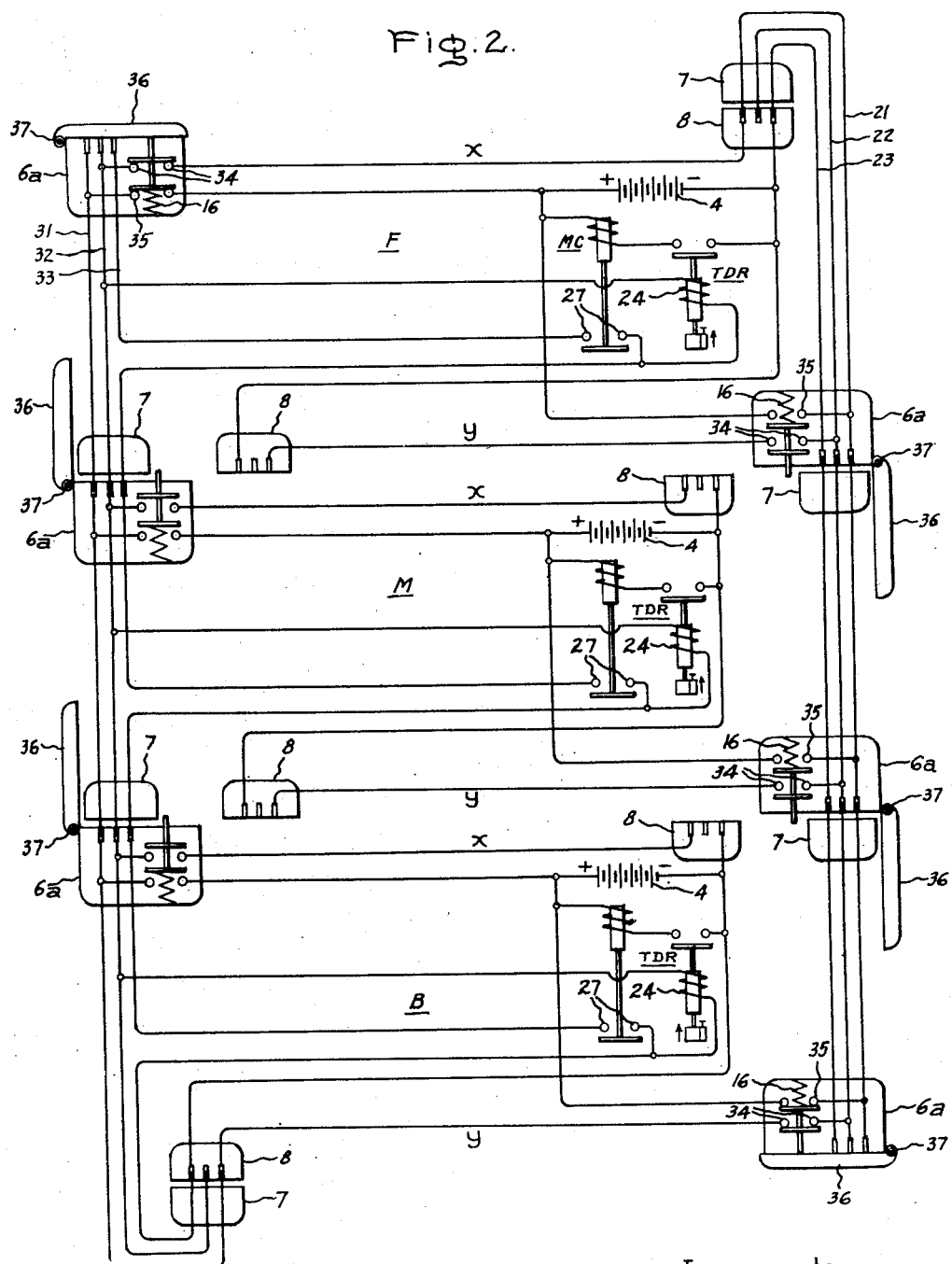

Patented Aug. 7, 1951

2,563,571

UNITED STATES PATENT OFFICE 2,563,571

VEHICLE ELECTRICAL DISTRIBUTION SYSTEM

William O. Woods, Erie, Pa., assignor to General Electric Company, a corporation of New York Application March 31, 1950, Serial No. 153,113

8 Claims. (Cl. 171—97)

My invention relates to an electrical distribution system for a double end vehicle adapted to be reversibly (end for end) connected in tandem with other similar vehicles. The invention is believed to have particular significance in allowing a train line system providing automatic interconnection of the auxiliary A. C. power systems of a plurality of cars each adapted to provide its own supply of A. C. power.

Much modern railway car electrical equipment (such as fluorescent lighting) makes alternating current supply advantageous but, heretofore, the obstacles have appeared so great that alternating current "train lining" (to use the vernacular of those skilled in the art) has been thought impractical. Ordinarily each railway passenger car, such as a dining car, sleeper or coach, has provision for obtaining electrical power from its own independent source (for one example, from its own diesel generator set). However, it is advantageous to have a plurality of such cars electrically interconnected both because such interconnection assures that any car may take power from another if its own power supply is disabled and also because the arrangement is more efficient. Engine efficiency is low at fractional load so that at times of light load it is desirable to have one car supply auxiliary power to several other cars. Furthermore, such parallel operation will improve voltage characteristics in case of sudden load changes such as often occur with the commencement of electric cooking or with the starting of a large air-conditioning compressor motor. It is desirable, however, that the power circuits between cars should be made or broken automatically when cars are coupled or uncoupled but not upon the contacts of the couplers (i. e., not within the intercar plug and receptacle sets), and with A. C. auxiliary power systems, it is generally believed necessary to connect individual power sources to the bus only one or two at a time to minimize disturbances caused by switching without synchronizing.

It is an object of the present invention to provide means for overcoming the above-mentioned difficulties.

It is a further object of the present invention to provide a double end vehicle electrical distribution system adapting the vehicle to be placed in an electrical train line system which allows all cars to be alike and reversible end for end and which allows an alternating current power train line to be made effective shortly after coupling and ineffective before uncoupling is completed.

Other objects and advantages will become apparent and my invention will be better understood from consideration of the following description taken in connection with the accompanying drawing in which Figs. 1 and 1a (taken together) represent a schematic diagram of three cars interconnected by a train line system in accordance with the invention; Fig. 2 is a simplified representation showing only control wiring but with modified receptacles 6a substituted for the receptacle 6 of Figs. 1 and 1a; Fig. 3 is an end view of a railway car provided with the requisite number of plugs and receptacles to adapt said car for the train line system of the invention; Fig. 4 is a diagrammatic representation of possible car arrangements assumed for the purpose of analyzing the electrical distribution system of the invention; Fig. 5 is a simplified schematic diagram of control wiring for two cars such as 55 and 56 of Fig. 4; and Fig. 6 is a simplified diagram of control wiring for a train of nine cars such as cars 58—66 of Fig. 4.

Referring now to Fig. 1 (and 1a), I have shown a schematic diagram of power and control train line circuits for a front, middle and back car indicated generally as F, M and B, respectively. Each car is shown with a battery 4 (for control) and an alternating current generator 5 assumed adapted to be driven by any convenient source of mechanical power such as a diesel engine (not shown). At opposite ends and diagonally opposite corners of each car, there is a train line receptacle 6, and at each end of each car there is a train line plug 7 (at the side of the car opposite the receptacle 6). Located adjacent each plug 7 is a dummy receptacle 8 which is used to receive plug 7 only at the outermost ends of the cars that happen to be first and last. For each car, the power lines comprise straight-through buses 1, 2 and 3 extending fore and aft along one side of the car, and at each end of the opposite side of the car the discontinuous buses 11, 12 and 13 cross connected to 1, 2 and 3, respectively, as shown.

The control lines for each car include three lines 21, 22 and 23 (figuratively shown extending along one side of the car), and three lines 31, 32 and 33 (figuratively shown extending along the opposite side of the car). The paralleled power buses and the control buses, which are substantially series connected when the system is in operation as hereinafter described, run between cars through the interconnecting devices (i. e., receptacles 6 and plugs 7 at each side of the train).

Each of the receptacles (except the dummy receptacles) has a multi-pole interlock arranged to be closed when the receptacle is not being used. In the embodiment shown in Fig. 1, the interlock contacts 14 and 15 of each receptacle 6 are bias closed by a spring 16 when the receptacle is not being used (as shown in the upper left corner of Fig. 1) but are opened by the force of insertion of associated plug 7 against the biasing spring when the receptacle is being used (as shown intermediate cars F and M). Thus, the interlocks are ineffective when the receptacle is engaged by the plug of another car, but at the extreme ends of the end cars the interlocks are effective and as shown, interlock 14 will connect control bus 32 through a wire 17, through dummy receptacle 8 and (when manually connected) plug 7 to control bus 21. Meanwhile, interlock 15 connects control bus 31 through a wire 18 to the positive side of battery 4 of the associated car. Of course, the terms positive and negative as used herein are purely exemplary. Actual polarity is relatively immaterial and those skilled in the art will realize that the polarity may even be only instantaneous since the entire control could be A. C. rather than battery powered. The dummy receptacles 8 are each provided for storing the associated unused plug 7 of any end car, and as shown in Fig. 1, the negative side of each battery 4 is connected through a wire 19 to the dummy receptacle at each end of the car in order that the wire 19 of any car which happens to be an end car may always be interconnected with one of the control lines at the respective end of the train.

As will hereinafter become apparent, the principal object in the arrangement above described is to immediately or sequentially (depending upon the number and arrangement of interconnected cars) apply control voltage to a timing device one each car. Each such device takes time (for example, a few seconds) to close after energization but opens immediately when subsequently de-energized. As one of many possible ways of introducing a time delay, I have shown, in Figs. 1–2, each car provided with a time delay relay TDR having a coil 24 and a normally open time delay closing contact 25. When contact 25 closes, control potential is supplied to a main contactor (MC) coil 26. This MC contactor has a normally open interlock 27 and main contacts 28. The main contacts 28 interconnect the train line bus (1, 2 and 3) with the car load and with the car's auxiliary source of voltage supply which may be alternatively either from generator 5 (when the generator's associated gang switch 29 is closed), or from a wayside power plug 30 adapted to be plugged into station facilities (not shown) when the car is at a standstill.

In Fig. 2 I have shown a simplified diagram (omitting the power connections) of three cars having control wiring somewhat the same as Fig. 1 except that car B of Fig. 2 has been turned around so that it is the same (end for end) as cars F and M and also, in Fig. 2, I have shown an alternative arrangement in which interlocks 34 and 35 of main receptacle 6a are adapted to be closed on a slightly different principle when the plug 7 is removed. Each receptacle 6a is provided with a spring closing cover 36 which is pushed aside when a plug 7 is inserted. When the plug is removed, cover 36 snaps shut due to the force of a hinge spring 37 greatly in excess of the interlock spring 16.

It will be understood from the above description that when two cars thus equipped are connected together, jumpers for both power and control interconnection are provided on each side of each intercar diaphragm, and in Fig. 3 I have shown a diagrammatic representation of an end view of a car (such as car B of Fig. 1) provided with plugs and receptacles similar to those described above. The car is provided with conventional track engaging wheels 41, steps 42 and an articulating vestibule covering or diaphragm 43 with a plug 7 and dummy receptacle 8 for the lines at one side of the car located at one side of the diaphragm and the unused receptacle 6 for power and control lines on the other side of the car located on the other side of the diaphragm.

An advantage of the present invention is that the power circuits for all of the cars of a train of cars greater than two in length will not be completed at the same time. In order to accomplish this and at the same time allow turning any one car end for end without materially affecting the operation of the scheme, it is necessary that the individual cars have a mechanical symmetry at their two ends although the control circuit wiring is unsymmetrical when considered from one end with respect to the same wiring considered from the other end. This will become more apparent from consideration of Fig. 4 which is a diagrammatic representation of possible car arrangements assumed for the purpose of analyzing the electrical distribution system of the invention. In Fig. 4 each individual car is indicated as having an $x$-end and a $y$-end. For convenience of cross reference, it may be assumed that the $x$-end is the end at which the battery is located in the F, M and B cars of Figs. 1, 1a and 2, and $y$ is the end opposite the battery end.

Car 51 of Fig. 4 is shown operated as a single car in which, of course, the receptacle interlocks (such as 14 and 15 of Fig. 1) will be closed at each end of the car and as soon as the last plug is inserted in its associated dummy socket, the time delay relay of the car will be energized, since a circuit may be traced (cf. car E, Fig. 1) from the plus side of the battery through interlock 15 of receptacle 6 at the lower righthand corner of the car through train line 21, through plug and dummy receptacle to wire 17, through interlock 14, through train wire 32, to TDR coil 24, through train line 33 to the other plug and dummy receptacle to wire 19 and back to the negative side of the battery.

In Fig. 4, car 52 (exactly the same as car M of Figs. 1 and 1a) has its $x$-end connected to the $y$-end of an end car and its $y$-end connected to the $y$-end of an end car. The receptacle interlocks 14 and 15 at the extreme ends of the end cars are closed and this will cause line 31 of car F to be positive from battery 4 of car F. This causes line 31 of M car 52 to also be positive and this causes line 21 of car B to be positive. When the end plugs 7 are inserted in the dummy receptacles 8 at the extreme ends of the end cars, a circuit may be traced from line 21 of car B through the bottom plug and dummy receptacle to line 17, through closed interlock 14 to wire 32 (car B), to TDR coil 24 of car B, through wire 33 of car B, wire 23 of car M, wire 23 of car F, through plug and dummy receptacle to the minus side of battery 4 of car F. TDR coil 24 of car M is simultaneously energized by a circuit which may be traced from the positive side of battery 4 of car B through adjacent closed interlock 15 to wire 31 of B, wire 21 of M, wire 21 of F, wire 17, closed interlock 14, wire 32 of F, wire 32 of M, TDR coil 24 of car M, wire 33, wire 23 of B and through the plug and dummy receptacle back to the negative side of battery 4 of car B. It should be observed, however, that a circuit is not completed to either the main contactor or the time delay relay of car F until TDR relay and main contactor of car M are picked up.

The slightly different situation of Fig. 2 is diagrammatically illustrated in Fig. 4 by car 53 which has its x-end connected to the y-end of an end car and its y-end connected to the x-end of an end car. In this case a study of the drawing makes it apparent that only one time delay device will be energized at the beginning. That is, with the end interlocks closed and the connections made through the plugs and dummy receptacles at the ends of the end cars, the only relay which will be immediately energized is the time delay closing relay of car B which is energized by a circuit which may be traced from the positive side of the battery of car B through closed interlock 35, train line 21, plug and dummy receptacle of car F, closed interlock 34, train line 32, TDR coil 24 of car B, plug 7 and receptacle 8 of car B, and back to the negative side of the battery. Thus, for the car under consideration (middle car 53) there will not be instantaneous energization of the circuit-making means although these means will be subsequently energized since when TDR of car B closes to pick up MC contactor of the same car and close its interlock contact 27, a circuit will be completed for TDR 24 of car M which may be traced from the plus side of battery 4 of car B through closed contact 35, train line 21, closed contact 34 to train line 32, to time delay closing relay coil 24 of car M, through the remainder of the discontinuous train line or control bus conductor 33, to interlock 27 of car B, through the remaining portion of train line 33, to end plug 7, dummy receptacle 8 and back to the negative side of battery 4 of car B.

It will be apparent from the above, and from consideration of the various arrangements hereinafter referred to, that whether the circuit of only one car is initially energized or the circuits of (at the most) two cars are simultaneously energized when the final end connections are made, depends on how the cars are turned end for end. While consideration of two-car trains is not particularly important, since in a two car train the major problem of interconnecting individual power sources not more than two at a time cannot arise, operation of the electrical system for a single car may be more clearly understood from consideration of various arrangements in a two-car train. Thus, car 54 is shown as one car of a two-car train with its y-end connected to the y-end of the other car, car 55 is shown as a car of a two-car train with its y-end connected to the x-end of the other car, car 56 is shown as a car of a two-car train with its x-end connected to the y-end of the other car and car 57 is shown as a car of a two-car train with its x-end connected to the x-end of the other car. It will be readily apparent that with the wiring for an individual car as shown in any of Figs. 1, 1a and 2, for the particular arrangement of car 54, the time delay means of that car will be energized at the same time that the time delay means of the other car is energized.

For car 55, however, the time delay means will not be operated until the time delay means of the other car (car 56) has operated. This will be apparent from consideration of Fig. 5 which is a simplified wiring diagram for the two cars 55 and 56 in each of which a time delay means represented by a single relay TD has been substituted for relay TDR, contactor MC, and MC contactor interlock 27 of Figs. 1-2. In Fig. 5 unused dummy receptacles (and some of the wiring to unused receptacle interlocks) have been omitted for the sake of clarity. In car 55 the time delay means can not be energized until the relay means in the other car has operated. For car 56, the time delay relay means will be energized from its battery of the same car as soon as the last end plug is inserted in its associated dummy receptacle.

Similarly, a circuit may be traced for the arrangement of car 57 to show that its time delay means will be energized immediately from the battery of the same car while the time relay means of the car to which it is connected is also being simultaneously energized from the battery of the car in which it is located.

Obviously, in a long train of cars a great number of permutations are possible. For example, in the nine-car train shown in Fig. 4, car 58 is an end car having its y-end connected to the y-end of an intermediate car 59. Car 59 has its y-end connected to the y-end of an end car and its x-end connected to the y-end of an intermediate car. Car 60 has its y-end connected to the x-end of an intermediate car and its x-end connected to the x-end of an intermediate car. Car 61 has its x-end connected to the x-end of an intermediate car and its y-end connected to the y-end of an intermediate car. Car 62 has its y-end connected to the y-end of an intermediate car and its x-end connected to the x-end of an intermediate car. Car 63 is arranged like car 61 and car 64 is arranged like car 62. Car 65 has its x-end connected to the x-end of an intermediate car and its y-end connected to the x-end of an end car. Car 66 is an end car having its x-end connected to the y-end of an intermediate car. The manner in which the energizing circuit of the time delay relay means of each of the cars 58—66 is completed may be readily understood by reference to Fig. 6 which is a very simplified schematic diagram from which much of the open circuited wiring has been omitted and the intercar and end of train connections have been simplified by omitting the plugs and receptacles. It will be apparent from Fig. 6 that of all of the relay means which in the illustrated embodiments are more directly connected with the control wiring on any one side of the train (i. e., of all of the relays in cars which are alike in the manner in which they are turned end for end) only one relay will be initially energized. Thus when the end connections are complete, the relay of car 59 is initially energized from the battery of car 59, and the relay of car 66 is initially energized from the battery of its own car 66. When the relay of car 59 picks up, a return circuit is provided for the relay of car 60 to the negative side of the battery of car 58, and after a suitable time delay this relay of car 60 will pick up. Meanwhile, the relay in car 66 closing completes the circuit for the relay in car 65 so that after a time delay it too picks up initiating energization of the coil in car 63 and after a time this relay picks up completing a circuit to the relay in car 61. After a time, the relay in car 61 picks up and completes the circuit for the relay in car 58. Obviously then, the sequence for the whole train (assuming that the time delays are all equal) will be first car 59 and car 66, then car 60 and car 65, then car 62 and car 63, then car 64 and car 61, and then car 58. However, it is not at all essential that the time delays be equal for the various cars, for the arrangement will obviously provide the desired results even if these delays are unequal.

It will be observed that with the system provided, the cars may be alike and yet reversible end for end. This turning end for end will not materially affect the operation of the scheme and this is one of the advantages thereof. It will be obvious that any number of cars having the same general arrangement may be coupled together to make up the train line system of the invention and no matter how long the train of cars, there will never be more than two car systems being connected to the power buses at the same time and this will minimize disturbances caused by switching without synchronizing on the system. The polyphase train line becomes effective soon after connections are completed without the necessity of closing any manual switch or even pushing a button. Alternators may be connected automatically to the bus but not more than one or two at a time, thus minimizing disturbances caused by switching which would be severe if it were possible to close at once contactors that would connect two long trains of cars electrically after they had been coupled up mechanically. When two cars each embodying the electrical distribution system of the invention are electrically coupled together by inserting a plug of one in a receptacle of the other first at one side of the cars and then at the other, the power circuits are made automatically but not upon the coupler contacts. This is so because, as will be obvious from Figs. 1 and 2, the control circuits on the two sides of the cars are in series while the power circuits are in parallel. Thus when car F is being electrically coupled to car M (for example), neither car can have its time delay means energized until the coupling is completed on both sides of the cars, and even after such means are energized there will be a time delay before the power bus is connected to any car load or source of auxiliary power.

When two cars are uncoupled at their mechanical (i. e., traction load carrying) couplers, any interconnected plugs and recepacles may be automatically pulled apart by relative movement of the two vehicles. With the system of the invention, it is simple to arrange the electrical couplings so that the plug and receptacle at one side of the cars will break before those at the other side, so that when the cars are automatically uncoupled the series control circuits will open (with consequent opening of all MC main contactors) before the paralleled power buses are completely opened. In this event, upon uncoupling the power circuits are not broken upon the coupler contacts, since upon uncoupling of either side the load is diverted for an instant to the other side after which all train line contactors open and the buses become dead so that the other side may be uncoupled safely without any destructive or dangerous arcing at the plug and receptacle connections. Conversely, as already explained, upon coupling the completion of connections at both sides is required before load is carried between cars. Thus plugs and jumpers of about one-half the current carrying capacity of the through busses may be used.

While I have illustrated and described particular embodiments of my invention, modifications thereof will occur to those skilled in the art. I desire it to be understood, therefore, that my invention is not to be limited to the particular arangements disclosed and I intend in the appended claims to cover all modifications which do not depart from the spirit and scope of my invention.

What I claim as new and desire to secure by Letters Patent of the United States is:

1. An electrical distribution system for a double end vehicle which is adapted to be connected in tandem with other similar vehicles, said system comprising a source of control power, a first intervehicle electrical connecting device associated with a first end of said vehicle, a second intervehicle electrical connecting device associated with said first end of said vehicle, a third intervehicle electrical connecting device associated with the second end of said vehicle, a fourth intervehicle electrical connecting device associated with said second end of said vehicle, control bus comprising conductors terminating in said first and third connecting devices, control bus comprising conductors terminating in said second and fourth connecting devices, interlocking means associated with said first intervehicle connecting device and arranged to provide a plurality of closed circuits through the interlocking means only when said device is not connected to a complementary device of a similar vehicle, interlocking means associated with said second intervehicle connecting device and adapted to provide a plurality of closed circuits through said interlocking means only when said device is not connected to a complementary device of a similar vehicle, interlocking means associated with said third intervehicle connecting device and arranged to provide a plurality of closed circuits through said interlocking means only when said device is not connected to a complementary device of a similar vehicle, interlocking means associated with said fourth intervehicle connecting device and adapted to provide a plurality of closed circuits through said interlocking means only when said device is not connected to a complementary device of a similar vehicle, connections from one end of said battery through said first interlocking means to a control conductor terminating at said first connecting device and through said fourth interlocking means to a control conductor terminating at said fourth interconnecting device, connections from the other end of said battery through said second interlocking means to a control conductor terminating at said second connecting device and through said third interlocking means to a control conductor terminating at said third connecting device, connections from a second control conductor terminating at said first and third connecting devices through said first interlocking means and through said second interlocking means to a second control conductor terminating at said second and fourth connecting devices, connections from a third control conductor terminating at said first and third connecting devices through said third interlocking means and through said fourth interlocking means to a third control conductor terminating at said second and fourth connecting devices, time delay means including a relay having a coil connected to be energized from two of said control conductors, said time delay means also including contact means adapted to close a predetermined time after said energization and said contact means being connected in the circuit of one of said control conductors, whereby when a plurality of such vehicles are placed in tandem with the intervehicle connecting devices interconnected, the control circuits of the control conductors terminating in said first and third connecting devices will be in series with the control conductors terminating in said second and fourth connecting devices and the function of said control conductors will not be materially affected by reversing the car or cars of a portion of said plurality end for end with respect to the positions of cars of the remainder of said plurality.

2. An electrical distribution system for a vehicle having a first end and a second end either of which is adapted to be mechanically and electrically connected to either end of a similar vehicle thereby to form a train of articulated vehicles electrically coupled together, a first receptacle and a first plug located at said first end, a second plug and a second receptacle located at said second end, first, second and third control bus conductors connecting said first receptacle and said second plug, fourth, fifth and sixth control bus conductors connecting said first plug and second receptacle, each of said plugs and receptacles being connectable to the receptacle and plug at the adjacent end of any similar vehicle to which the respective end is connected and each of said receptacles and plugs having first and second interlocking means for completing circuits to associated control bus conductors only when the respective plug or receptacle is not connected to the receptacle or plug of another car, a source of control power having first and second source terminals, connections from said first source terminal to first and second receptacle first interlocking means and therefrom, respectively, to first and sixth control bus conductors, connections from said second source terminal to first and second plug first interlock means and therefrom, respectively, to fourth and third control bus conductors, connections between first receptacle and first plug second interlock means and therefrom, respectively, to second and sixth control bus conductors, connections between second plug and second receptacle second interlock means and therefrom, respectively, to first and fifth control bus conductors, relay means having an operating coil connected between second and third control bus conductors, said relay means having contact means arranged to close after a predetermined time delay responsive to energization of said operating coil, power circuits associated with said contact means, and means for interrupting the circuit of said third control bus conductor between ends of said vehicle responsive to opening of said contact means.

3. An electrical distribution system for a double end vehicle either end of which is adapted to be connected to the end of another similar vehicle said vehicles thereby being adapted to form a train of articulated vehicles, said system comprising power bus and control bus, a power and control bus receptacle at each end of said vehicle and a power and control bus plug at each end of said vehicle connectable to the corresponding receptacle at the adjacent end of any similar vehicle, a power circuit including the electrical load of said vehicle and at least one source of electrical power therefor, solenoid operated power circuit contact means for connecting said power circuit to said power bus, a source of control power having two terminals, first interlocking means associated with each of said receptacles for completing a circuit to at least one of the control bus conductors terminating thereat when said receptacle is unoccupied by plug of a similar car, second interlocking means associated with each of said plugs and including a dummy receptacle for manually completing a circuit to at least two of the control bus conductors terminating at said plug when said plug is not occupying the receptacle of a similar car, circuit means from one of said source of control power terminals through said first interlocking means at each end of said car and from the other of said terminals to the dummy receptacle at each end of said car circuit means associated with said interlocking means and with all of said plugs, receptacles and dummy receptacles for energizing said solenoid for operating said power circuit contact means when said vehicle is not articulated to a similar vehicle, time delay means interposed in said last mentioned circuit for delaying the closing of said power circuit contact means for a predetermined time after energization of said circuit, and interlocking means arranged responsive to said time delay means and connected in the circuit of one of said control bus conductors for completing the circuit to the time delay means and solenoid coil of a similar car when one end thereof is connected to one end of said first vehicle.

4. Auxiliary electrical power control for a railway vehicle comprising a battery source of control power, a relay having a coil and a contact adapted to close after a time delay when said coil is energized, a contactor having a coil and a normally open interlock contact, circuit means for energizing said contactor coil from said battery source through said time delay closing contact element, means for energizing said relay coil from said battery source when said car stands alone, means for rendering said last-mentioned means inoperative when a similar car is electrically coupled to one end of said car, and circuit means for energizing said relay coil from the battery source and through the normally open contactor interlock of a similar car when one end thereof is electrically coupled to one end of said first car.

5. An auxiliary electrical power distribution and control system for a railway vehicle comprising a source of control power, a relay having a coil and a time delay closing contact element, a contactor having a coil and a normally open interlock contact, circuit means for energizing said contactor coil from said source through said time delay closing contact element, means for energizing said relay coil from said source when said car stands alone, and means for rendering said last-mentioned means inoperative and for energizing said relay coil through the normally open contactor interlock of a similar car when one end of said similar car is electrically coupled to one end of said first car.

6. An auxiliary electrical power distribution control system for a railway vehicle which is reversible end for end while adapted to be connected together with like vehicles to form a train of cars, said system comprising an electrical load, load wiring connected to said load, an electric alternator, switching means for selectively connecting or disconnecting said alternator from said load wiring, a wayside power plug connected to said load wiring to selectively energize the same from a station source of power, a battery source of control power, a relay having a coil and a time delay closing contact member adapted to close after a time delay when said coil is energized, a main contactor having an energizing coil, a plurality of main contacts, and a normally open interlock contact, connections from said battery source through said time delay relay contact to said main contactor energizing coil for energizing said contactor coil after a predetermined time delay after energization of said relay coil, and connectable parallel circuit busses for said vehicle comprising a plurality of straight through power busses arranged along a first side of said vehicle and stub power busses connected in parallel with said straight through power busses and arranged to terminate at each end of a second side of said car, substantially series circuit control busses for said vehicle comprising a plurality of straight through control bus conductors along said first side of said car and a plurality of control bus conductors arranged generally along said second side of said vehicle, plug and receptacle means for coupling said power bus conductors and said control bus conductors with those of similar cars at either end of said car and comprising a plug at a first end and a receptacle at a second end of said power and control busses arranged along said first side of said car and a receptacle at said first end and a plug at said second end of said power and control busses terminating at the ends of said second side of said car, interlock means associated with each of said receptacles and including a plurality of interlocks adapted to be open when said receptacle is occupied by the plug of an adjacent car and closed when said receptacle is unoccupied to complete a plurality of circuits from a plurality of said control bus conductors terminating in said receptacle when said car stands alone or when said receptacle is at the outer most end of an end car of a train of such cars, a dummy receptacle located adjacent the respective plug at each end of said car and for receiving said plug when said car stands alone or when said plug is at the outermost end of an end car of a train of such cars, whereby means are provided for energizing said relay coil from said battery source when said car stands alone and means are provided for rendering said last-mentioned means inoperative when a similar car is electrically coupled to one end of said car and circuit means are provided for energizing said relay coil from the battery source of another car and through the normally open contactor interlock of another car when one end thereof is electrically coupled to one end of said first car.

7. An electrical distribution system for a double end vehicle either end of which is adapted to be connected to either end of another similar vehicle said vehicles thereby being adapted to form a train of articulated electrically interconnected vehicles, said system comprising a car load, a car generator, power busses terminating at each end of each side of said car, control busses extending generally along each side of said car and terminating at each end thereof, a power and control bus receptacle at each end and at two diagonally opposite corners of said car, each of said power and control bus receptacles being provided with at least two interlock contacts which are arranged to be closed when said receptacle is unoccupied and open when said receptacle is occupied by a corresponding plug of another car, a power and control bus plug at each end and at the other two diagonally opposite corners of said car, a source of control power for each car, a relay having an operating coil and a contact adapted to close after a time delay when said coil is energized, a main contactor having an operating coil connected through said relay contact to said source of control power to adapt said main contactor to be operated when said time delay contact is closed and having normally open main contacts connected in circuit between said power bus and said load and between said power bus and said generator, said main contactor having an interlock which is adapted to close when the main contactor coil is energized, connections from said time delay relay operating coil to two of the control bus on one side of said car and connections from said main contactor interlock to place it in series with the circuit of one of said control bus, a dummy receptacle adjacent each of said power and control bus plugs at opposite ends and diagonally opposite corners of said car and adapted to receive said plugs when the respective plug is located at the extreme end of an electrically interconnected train, and connections from said source of control power to one of the receptacle interlock contacts at one end of said car and therefrom to one of the control bus terminating at said receptacle and from said control power source to the dummy receptacle at the opposite side of the same end of said car, cross connections from said source of control power to one of the receptacle interlock contacts at the opposite end of said car and therefrom to one of the control bus terminating at said receptacle and to the dummy receptacle at said opposite end of said car, and connections from a control bus at one side of said car through the receptacle interlock and dummy receptacle at each end of said car for connecting to a control bus at the opposite side of said car when said end is not electrically connected to an adjacent end of a similar car and the associated plug is placed in the respective dummy receptacle, whereby each of said cars has provision for obtaining electrical power from its own source or from another car in the system, all the cars may be electrically alike and reversible end for end, and individual power sources may be interconnected only one or two at a time thereby to minimize disturbances in the system.

8. An electrical distribution system for a double end vehicle which is adapted to be connected in tandem with other similar vehicles, said system comprising a car electrical circuit, a car generator, a wayside power plug, power busses terminating at each end of each side of said car, control busses at each side of said car and terminating at each end thereof, a first inter-vehicle connecting device comprising a power and control bus receptacle located at a first end of said vehicle and adjacent a first corner thereof, a second inter-vehicle connecting device comprising a power and control bus plug at said first end of said vehicle and adjacent a second corner thereof, a third inter-vehicle connecting device comprising a power and control bus plug located at a second end of said vehicle and adjacent a third corner thereof diagonally opposite said second corner, a fourth inter-vehicle connecting device comprising a power and control bus receptacle at said second end of said vehicle and adjacent a fourth corner thereof, each of said power and control bus receptacles being provided with at least two interlock contacts each associated with a different control bus conductor terminating thereat and arranged to be closed when said receptacle is unoccupied and open when said receptacle is occupied by a corresponding plug of another car, a dummy receptacle adjacent each of said plugs and adapted to receive the corresponding plug when said plug is not used to interconnect with the corresponding receptacle of another car, a battery source of control power, a relay having an operating coil and a contact adapted to close after a time delay when said coil is energized, a main contactor having an operating coil and a set of main contacts adapted to connect said power bus to the car load, car generator, and wayside power plug, connections from said battery source of control power through said relay contact to said contactor operating coil for closing said main contacts when said relay contact closes, connections from one side of said relay coil to one of the control bus conductors at one side of said car and from the other side of said coil to another of the control bus conductors at the same side of said car for energizing said relay coil from said control bus conductors, said main contactor having an interlock which closes when said contactor operating coil is energized, and connections from said interlock to opposite car ends of one of the control bus conductors at one side of said car, whereby when said vehicle is interconnected in a train of cars with a plurality of similar vehicles each of said cars has provision for obtaining electrical power from its own sources or from another car in the system, all of the cars may be electrically alike and reversible end for end, and the power circuits may be made automatically and individual power sources may be interconnected only one or two at a time to minimize disturbances in the system.

WILLIAM O. WOODS.

No references cited.